United States Patent
Bayareddy et al.

(10) Patent No.: US 9,858,132 B1
(45) Date of Patent: *Jan. 2, 2018

(54) SYSTEMS AND METHODS FOR FACILITATING ATOMIC DELIVERY OF BUNDLED DATA SETS TO APPLICATIONS WITHIN DISTRIBUTED SYSTEMS

(71) Applicant: Juniper Networks, Inc., Sunnyvale, CA (US)

(72) Inventors: Srinath Bayareddy, San Jose, CA (US); Aditya Thakur, Ottawa (CA); Vijay Paul, Cupertino, CA (US); David Katz, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,345

(22) Filed: Mar. 2, 2016

Related U.S. Application Data

(63) Continuation of application No. 14/666,261, filed on Mar. 23, 2015, now Pat. No. 9,317,347.

(51) Int. Cl.
| | |
|---|---|
| *G06F 9/44* | (2006.01) |
| *H04L 12/715* | (2013.01) |
| *G06F 9/54* | (2006.01) |
| *H04L 12/801* | (2013.01) |

(52) U.S. Cl.
CPC .............. *G06F 9/546* (2013.01); *H04L 47/18* (2013.01)

(58) Field of Classification Search
None
See application file for complete search history.

(56) References Cited

U.S. PATENT DOCUMENTS

| | | | |
|---|---|---|---|
| 6,161,125 | A | 12/2000 | Traversat et al. |
| 6,611,519 | B1 | 8/2003 | Howe |
| 6,704,801 | B1 | 3/2004 | Minyard |
| 7,649,884 | B1 | 1/2010 | Ahmed et al. |
| 9,317,347 | B1 | 4/2016 | Bayareddy et al. |

(Continued)

OTHER PUBLICATIONS

Warski, "Evaluating persistent, replicated message queues", Jul. 1, 2014, pp. 1-14.*

(Continued)

*Primary Examiner* — H S Sough
*Assistant Examiner* — Phuong N Hoang
(74) *Attorney, Agent, or Firm* — FisherBroyles, LLP

(57) ABSTRACT

The disclosed computer-implemented method for facilitating atomic delivery of bundled data sets to applications within distributed systems may include (1) receiving, at a queue of an application, a data set from at least one other application, (2) determining that the data set is incorporated in a bundle whose contents have yet to completely arrive at the queue, (3) gating the data set at the queue until the bundle's contents have completely arrived at the queue, (4) receiving, at the queue, another data set incorporated in the bundle, (5) determining that the bundle's contents have completely arrived at the queue based at least in part on receiving the other data set, and then (6) notifying the application that the bundle is ready for atomic delivery such that the application is able to consume the bundle's contents on an as-needed basis. Various other methods, systems, and computer-readable media are also disclosed.

16 Claims, 8 Drawing Sheets

(56) References Cited

U.S. PATENT DOCUMENTS 9,471,402 B1    10/2016    Bayareddy et al.
2004/0052266 A1    3/2004    Meyer et al.

OTHER PUBLICATIONS

Geek, "Benchmarking Message Queue Latency", Jun. 1, 2014, pp. 1-58.*
Felber et al., "Probabilistic Atomic Broadcast", Mar. 20, 2002, pp. 1-22.*
Aweisberg, "Voltcore", Jun. 6, 2012, pp. 1-4.*
Srinath Bayareddy, et al.; Systems and Methods for Facilitating Dependency-Ordered Delivery of Data Sets to Applications Within Distributed Systems; U.S. Appl. No. 14/666,266, filed Mar. 23, 2015.
"What is Cisco IOS XE", http://www.cisco.com/c/en/us/products/collateral/ios-nx-os-software/ios-xe-3sg/QA_C67-622903.html, as accessed Feb. 12, 2015, Cisco, Forwarding and Feature Manager in IOS XE, (May 2012).
Paruchuri, Vamsi K., et al., "Optimal Flooding Protocol for Routing in Ad-hoc Networks", (Jun. 7, 2010).

* cited by examiner

SYSTEMS AND METHODS FOR FACILITATING ATOMIC DELIVERY OF BUNDLED DATA SETS TO APPLICATIONS WITHIN DISTRIBUTED SYSTEMS

CROSS REFERENCE TO RELATED APPLICATION

This application is a continuation of U.S. application Ser. No. 14/666,261 filed 23 Mar. 2015, the disclosure of which is incorporated, in its entirety, by this reference.

BACKGROUND

Applications running within a computing environment may send certain data and/or objects (sometimes also referred to as "state") to one another. For example, a first application running within a traditional computing environment may produce configuration and/or operational objects for consumption by a second application running within the computing environment. As the configuration and/or operational objects are produced, the first application may send the configuration and/or operational objects to the second application for consumption. The second application, however, may be unable to properly consume the configuration and/or operational objects until all of the objects have arrived at the second application due to certain data dependencies.

Unfortunately, the applications and/or the traditional computing environment itself may have certain shortcomings and/or deficiencies that negatively impact efficiency and/or scaling within such a computing environment. For example, in the event that the first application produces and sends large quantities (e.g., millions) of related objects for consumption, the second application may be unable to consume the related objects all at once due to certain processing limitations. As a result, in the traditional computing environment, the second application may be forced to consume such objects as a bundle organized in a specific order (e.g., a linear order or the order of arrival) even in the event that the application is interested mostly or only in select objects located out of order in the bundle.

Moreover, in the event that a small portion of the objects within the bundle have become outdated, the first application may be unable to update only those outdated objects without re-transferring all of the objects within the bundle to the second application. The instant disclosure, therefore, identifies and addresses a need for systems and methods for facilitating atomic delivery and/or updating of bundled data sets within distributed systems.

SUMMARY

As will be described in greater detail below, the instant disclosure describes various systems and methods for facilitating atomic delivery of bundled data sets to applications within distributed systems. In one example, a computer-implemented method for facilitating atomic delivery of bundled data sets to applications within distributed systems may include (1) receiving, at a queue of an application running within a distributed system, a data set from at least one other application running within the distributed system, (2) determining that the data set received from the other application is incorporated in a bundle whose contents have yet to completely arrive at the queue of the application, (3) gating, due at least in part to the data set being incorporated in the bundle, the data set at the queue of the application at least until the bundle's contents have completely arrived at the queue of the application, (4) receiving, at the queue of the application, another data set incorporated in the bundle from the other application running within the distributed system, (5) determining that the bundle's contents have completely arrived at the queue of the application based at least in part on receiving the other data set incorporated in the bundle, and then in response to determining that the bundle's contents have completely arrived at the queue of the application, (6) notifying the application that the bundle is ready for atomic delivery to the application such that the application is able to consume the bundle's contents on an as-needed basis.

In one embodiment, a system for implementing the above-described method may include a receiving module that receives, at a queue of an application running within a distributed system, a data set from at least one other application running within the distributed system. The system may also include a determination module that determines that the data set received from the other application is incorporated in a bundle whose contents have yet to completely arrive at the queue of the application. The system may further include a gating module that gates, due at least in part to the data set being incorporated in the bundle, the data set at the queue of the application at least until the bundle's contents have completely arrived at the queue of the application. In this embodiment, the receiving module may also receive, at the queue of the application, another data set incorporated in the bundle from the other application running within the distributed system. The determination module may further determine that the bundle's contents have completely arrived at the queue of the application based at least in part on receiving the other data set incorporated in the bundle. The system may additionally include a delivery module that notifies, in response to the determination that the bundle's contents have completely arrived at the queue of the application, the application that the bundle is ready for atomic delivery to the application such that the application is able to consume the bundle's contents on an as-needed basis. Finally, the system may include at least one physical processor that executes the receiving module, the determination module, the gating module, and the delivery module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a queue of an application running within a distributed system, a data set from at least one other application running within the distributed system, (2) determine that the data set received from the other application is incorporated in a bundle whose contents have yet to completely arrive at the queue of the application, (3) gate, due at least in part to the data set being incorporated in the bundle, the data set at the queue of the application at least until the bundle's contents have completely arrived at the queue of the application, (4) receive, at the queue of the application, another data set incorporated in the bundle from the other application running within the distributed system, (5) determine that the bundle's contents have completely arrived at the queue of the application based at least in part on receiving the other data set incorporated in the bundle, and then in response to determining that the bundle's contents have completely arrived at the queue of the application, (6) notify the application that the bundle is ready for atomic delivery to the application such that the application is able to consume the bundle's contents on an as-needed basis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
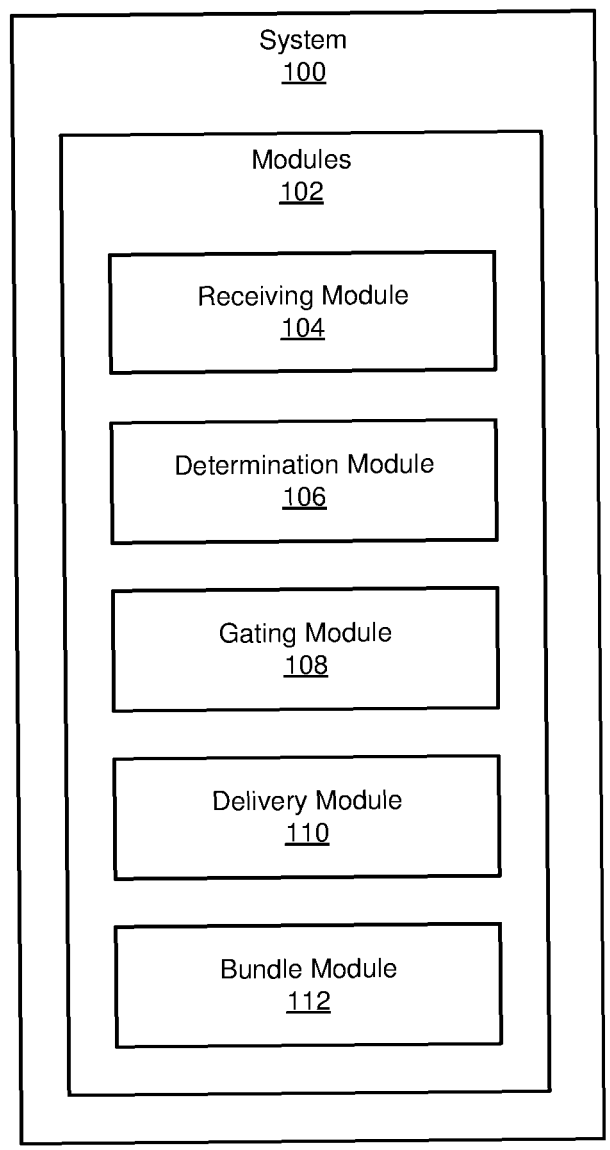
FIG. 1 is a block diagram of an exemplary system for facilitating atomic delivery of bundled data sets to applications within distributed systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating atomic delivery of bundled data sets to applications within distributed systems. The term "atomic," as used herein, generally refers to any type or form of operation and/or task performed as a whole (instead of being performed as a series of subparts to the whole). Accordingly, the phrase "atomic delivery of bundled data sets," as used herein, generally refers to any type or form of operation and/or task that presents, to an application, a bundle of data sets as a whole (instead of presenting the bundle of data sets as a series of subparts to the whole) such that the application is able to access and/or consume any data set within the bundle at any given time.

As will be explained in greater detail below, by providing an application with an input queue that builds a bundle for the application by organizing the bundle's contents into at least one flexible data structure (such as a tree, linked list, vector, map, and/or hash table), the systems and methods described herein may be able to facilitate atomic delivery of the bundle's contents to the application by presenting the bundle's contents to the application via the data structure. Additionally or alternatively, the systems and methods described herein may be able to modify the bundle's contents to incorporate certain updated versions of the bundle's contents without re-transferring any redundant versions of the bundle's contents from the other application to the queue of the application, thereby potentially improving the efficiency and/or scalability of the distributed system by reducing the amount of resources and/or bandwidth consumed in connection with such updates. Moreover, the systems and methods described herein may be able to facilitate atomic delivery of embedded heterogeneous bundles (e.g., a bundle of one type embedded within a bundle of another type), thereby potentially improving the efficiency and/or scalability of the distributed system as the number of applications and/or data transfers increases within the distributed system.

Figure 2:
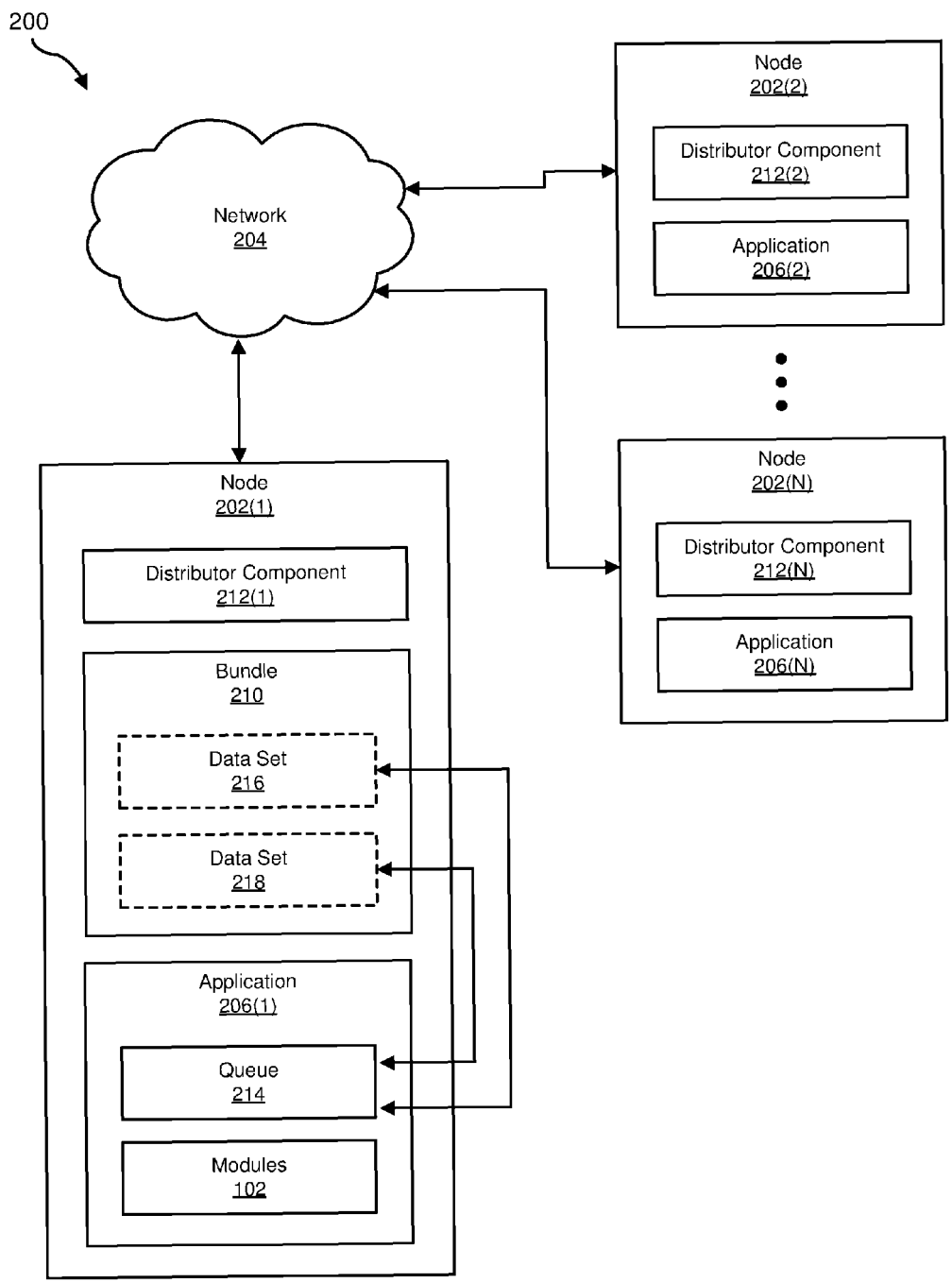
FIG. 2 is a block diagram of an additional exemplary system for facilitating atomic delivery of bundled data sets to applications within distributed systems.

The following will provide, with reference to FIGS. 1 and 2, detailed descriptions of exemplary systems for facilitating atomic delivery of bundled data sets to applications within distributed systems. Detailed descriptions of corresponding computer-implemented methods will be provided in connection with FIG. 3. Detailed descriptions of exemplary metadata of a bundle of data sets will be provided in connection with FIG. 4. Detailed descriptions of an exemplary bundle that includes a root and a plurality of nodes will be provided in connection with FIG. 5. Detailed descriptions of an exemplary bundle that includes a root node, a plurality of bundle roots, and a plurality of content nodes will be provided in connection with FIG. 6. Detailed descriptions of exemplary data sets represented by content nodes will be provided in connection with FIG. 7. In addition, detailed descriptions of an exemplary computing system capable of implementing one or more of the embodiments described herein will be provided in connection with FIG. 8.

FIG. 1 is a block diagram of an exemplary system 100 for facilitating atomic delivery of bundled data sets to applications within distributed systems. As illustrated in this figure, exemplary system 100 may include one or more modules 102 for performing one or more tasks. For example, and as will be explained in greater detail below, exemplary system 100 may include a receiving module 104 that receives, at a queue of an application running within a distributed system, a data set from at least one other application running within the distributed system. Exemplary system 100 may also include a determination module 106 that determines that the data set received from the other application is incorporated in a bundle whose contents have yet to completely arrive at the queue of the application.

In addition, and as will be described in greater detail below, exemplary system 100 may include a gating module 108 that gates, due at least in part to the data set being incorporated in the bundle, the data set at the queue of the application at least until the bundle's contents have completely arrived at the queue of the application. In some examples, receiving module 104 may further receive, at the queue of the application, another data set incorporated in the bundle from the other application running within the distributed system. In such examples, determination module 106 may further determine that the bundle's contents have completely arrived at the queue of the application based at least in part on receiving the other data set incorporated in the bundle.

Moreover, exemplary system 100 may include a delivery module 110 that notifies, in response to the determination that the bundle's contents have completely arrived at the queue of the application, the application that the bundle is ready for atomic delivery to the application such that the application is able to consume the bundle's contents on an as-needed basis. Additionally or alternatively, exemplary system 100 may include a bundle module 112 that builds the bundle at the queue of the application by organizing the bundle's contents into at least one data structure. Although illustrated as separate elements, one or more of modules 102 in FIG. 1 may represent portions of a single module or application (e.g., a network operating system (such as JUNIPER NETWORKS' JUNOS OPERATING SYSTEM and/or CISCO'S IOS)).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., node 202(1) and/or nodes 202(2)-(N)) and/or computing system 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary distributed system 200 in FIG. 2. The term "distributed system," as used herein, generally refers to any type or form of computing environment that includes a plurality of nodes executing applications that interface and/or collaborate with one another. In one example, distributed system 200 may provide a computing environment in which applications have no guarantee of any specific ordering of data sets being delivered for processing and/or consumption (even though such data sets may have certain dependencies on one another).

The term "dependency," as used herein, generally refers to any type or form of state and/or condition that is necessary for the proper function, processing, and/or consumption of data. Examples of such a dependency include, without limitation, delivery and/or processing of a data set together with at least one other data set, delivery and/or processing of a specific ordering and/or arrangement of data sets, delivery and/or processing of a data set together with a specific version (e.g., an updated version) of another other data set, delivery and/or processing of a data set together with any version of another other data set, variations of one or more of the same, combinations of one or more of the same, or any other suitable data sets.

As shown in FIG. 2, distributed system 200 may include a node 202(1) in communication with one or more of nodes 202(2)-(N) via a network 204. In one example, node 202(1) may be programmed with one or more of modules 102 to facilitate atomic delivery of bundled data sets to applications within distributed systems. Additionally or alternatively, one or more of nodes 202(2)-(N) may be programmed with one or more of modules 102 (although not necessarily illustrated as such in FIG. 2) to facilitate atomic delivery of bundled data sets to applications within distributed systems.

As illustrated in FIG. 2, nodes 202(1)-(N) may include and/or execute applications 206(1)-(N), respectively, that interface and/or collaborate with one another in certain ways. In some examples, application 206(1) may include a queue 214 that receives, gates, rearranges, builds, and/or delivers bundled data sets (such as bundle 210) in connection with application 206(1). Additionally or alternatively, queue 214 may reside outside of application 206(1) and facilitate atomic delivery of bundled data sets (such as bundle 210) to application 206(1) by receiving, gating, rearranging, building, and/or delivering such bundled data sets. Applications 206(2)-(N) may also include an instance of queue 214 (although not necessarily illustrated as such in FIG. 2).

In some examples, application 206(1) may include and/or be programmed with one or more of modules 102. For example, one or more of modules 102 may be integrated into queue 214. Additionally or alternatively, one or more of modules 102 may reside inside of application 206(1) but outside of queue 214. Applications 206(2)-(N) may also include and/or be programmed with one or more of modules 102 (although not necessarily illustrated as such in FIG. 2). Moreover, although illustrated as running on separate nodes in FIG. 2, application 206(1) and one or more of applications 206(2)-(N) may alternatively run on a single node (such as node 202(1)) within distributed system 200.

As illustrated in FIG. 2, nodes 202(1)-(N) may include and/or execute distributor components 212(1)-(N), respectively, that facilitate transferring bundled data sets within distributed system 200 via network 204. In one example, node 202(1) may include data sets 216 and 218 received at different points in time from one or more of nodes 202(1)-(N) via network 204. In this example, data sets 216 and 218 may be incorporated in and/or represent portions of a bundle 210.

In one embodiment, one or more of modules 102 from FIG. 1 may, when executed by at least one processor of node 202(1), enable node 202(1) to facilitate atomic delivery of bundled data sets to applications within distributed system 200. For example, and as will be described in greater detail below, one or more of modules 102 may cause node 202(1) to (1) receive, at queue 214 of application 206(1) running within distributed system 200, data set 216 from application 206(2) running within distributed system 200, (2) determine that data set 216 received from application 206(2) is incorporated in bundle 210 whose contents have yet to completely arrive at queue 214 of application 206(1), (3) gate, due at least in part to data set 216 being incorporated in bundle 210, data set 216 at queue 214 of application 206(1) at least until the bundle's contents have completely arrived at queue 214 of application 206(1), (4) receive, at queue 214 of application 206(1), data set 216 incorporated in bundle 210 from application 206(1) running within distributed system 200, (5) determine that the bundle's contents have completely arrived at queue 214 of application 206(1) based at least in part on receiving data set 216 incorporated in bundle 210, and then in response to determining that the bundle's contents have completely arrived at queue 214 of application 206(1), (6) notify application 206(1) that bundle 210 is ready for atomic delivery to application 206(1) such that application 206(1) is able to consume the bundle's contents on an as-needed basis.

Nodes 202(1)-(N) generally represent any type or form of physical and/or virtual computing environment capable of running within a distributed system. In one example, nodes 202(1)-(N) may each include and/or represent a physical computing device. In another example, one or more of nodes 202(1)-(N) may include and/or represent a virtual machine running on a physical computing device. In some examples, multiple nodes within nodes 202(1)-(N) may include and/or represent multiple virtual machines running on a single physical computing device. Examples of nodes 202(1)-(N) include, without limitation, routers, switches, bridges, network hubs, gateways, servers, laptops, tablets, desktops, cellular phones, Personal Digital Assistants (PDAs), multimedia players, embedded systems, wearable devices (e.g., smart watches, smart glasses, etc.), gaming consoles, virtual machines running on one or more of the same, variations of one or more of the same, combinations of one or more of the same, exemplary computing system 800 in FIG. 8, or any other suitable node.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 204 may facilitate communication or data transfer using wireless or wired connections. In one embodiment, network 204 may facilitate communication among nodes 204(1)-(N). Although nodes 202(1)-(N) and network 204 are illustrated as separate entities in FIG. 2, nodes 202(1)-(N) may alternatively include and/or represent portions of network 204.

Applications 206(1)-(N) generally represent any type or form of software, application, and/or program capable of running in a physical and/or virtual computing environment. In some examples, output originating from one of applications 206(1)-(N) may be used as input for another one of applications 206(1)-(N). Examples of applications 206(1)-(N) include, without limitation, control-plane applications, services-plane applications, traffic-transforming applications, traffic-monitoring applications (such as MONITUBE), load-balancing and/or traffic-classification applications (such as EQUILIBRIUM), third-party applications capable of running on a network operating system (such as JUNIPER NETWORKS' JUNOS OPERATING SYSTEM and/or CISCO'S IOS), variations of one or more of the same, combinations of one or more of the same, or any other suitable applications.

Distributor components 212(1)-(N) generally represent any type or form of unit, module, and/or mechanism that facilitates data transfer for one or more applications running on a node within a distributed system. In some examples, distributor components 212(1)-(N) may each correspond to a specific node. In other words, each node may include a single distributor component that facilitates data transfer for all of the applications (whether singular or multiple) running on that particular node. In one example, distributor component 212(1) may reside on node 202(1) and facilitate data transfer on behalf of application 206(1) with respect to distributed system 200. In this example, distributor component 212(2) may reside on node 202(2) and facilitate data transfer on behalf of application 206(2) with respect to distributed system 200. Similarly, distributor component 212(N) may reside on node 202(N) and facilitate data transfer on behalf of application 206(N) with respect to distributed system 200.

Queue 214 generally represents any type or form of physical and/or logical storage device and/or mechanism that stores, maintains, and/or gates data. In one example, queue 214 may include and/or represent a buffer that temporarily stores bundled data sets intended for consumption by application 206(1). Additionally or alternatively, queue 214 may include a library used by application 206(1) to facilitate atomic delivery of bundled data sets to application 206(1). Queue 214 may sometimes be referred to as a binding queue or an input queue. Examples of queues 214 include, without limitation, physical and/or logical representations of On Chip Memory (OCM), Random Access Memory (RAM), Dynamic Random Access Memory (DRAM), Static Random Access Memory (SRAM), Synchronous Dynamic Random Access Memory (SDRAM), flash memory, memory buffers, portions of one or more of the same, variations of one or more of the same, combinations of one or more of the same, or any other suitable queue.

Data sets 216 and 218 generally represent any type or form of encapsulated data, object, and/or information. In some examples, data sets 216 and/or 218 may include and/or represent input that queue 214 is to deliver to application 206(1) as part of bundle 210. In one example, data set 216 may have one or more dependencies on data set 218. As a result, application 206(1) may be unable to properly process and/or consume data set 216 without data set 218. To satisfy these dependencies, data set 218 may need to be delivered to application 206(1) along with data set 216 so that application 206(1) is able to properly process and/or consume data set 216. Additionally or alternatively, data sets 216 and 218 may have certain dependencies on bundle 210 that prevent atomic delivery of data sets 216 and 218 to application 206(1) until all of the bundle's contents have arrived at queue 214. Examples of data sets 216 and 218 include, without limitation, configuration data, operational data, routing data, traffic statistical data, variations of one or more of the same, combinations of one or more of the same, or any other suitable data sets.

Bundle 210 generally represents any type or form of collection of data sets (sometimes referred to herein as "bundled data sets") capable of being delivered atomically to an application within a distributed system. In some examples, bundle 210 may include and/or identify various data sets organized into a logical collection for atomic delivery to application 206(1). In one example, all of the data sets included in and/or identified by bundle 210 may need to arrive at queue 214 of application 206(1) prior to the bundle's atomic delivery to application 206(1). In this example, bundle 210 may include one or more embedded sub-bundles (e.g., a bundle of one type embedded within a bundle of another type). Additionally or alternatively, bundle 210 may include certain metadata that defines and/or identifies the bundle's contents (e.g., data sets), architecture, and/or dependencies. This metadata may be generated and/or defined by the application sending the bundle's contents to the application that will eventually consume the bundle's contents. Examples of types and/or architectures of bundles include, without limitation, tree data structures, list data structures (such as linked lists), vector data structures, map data structures, hash tables, variations of one or more of the same, combinations of one or more of the same, or any other suitable types or architectures of bundles.

Figure 3:
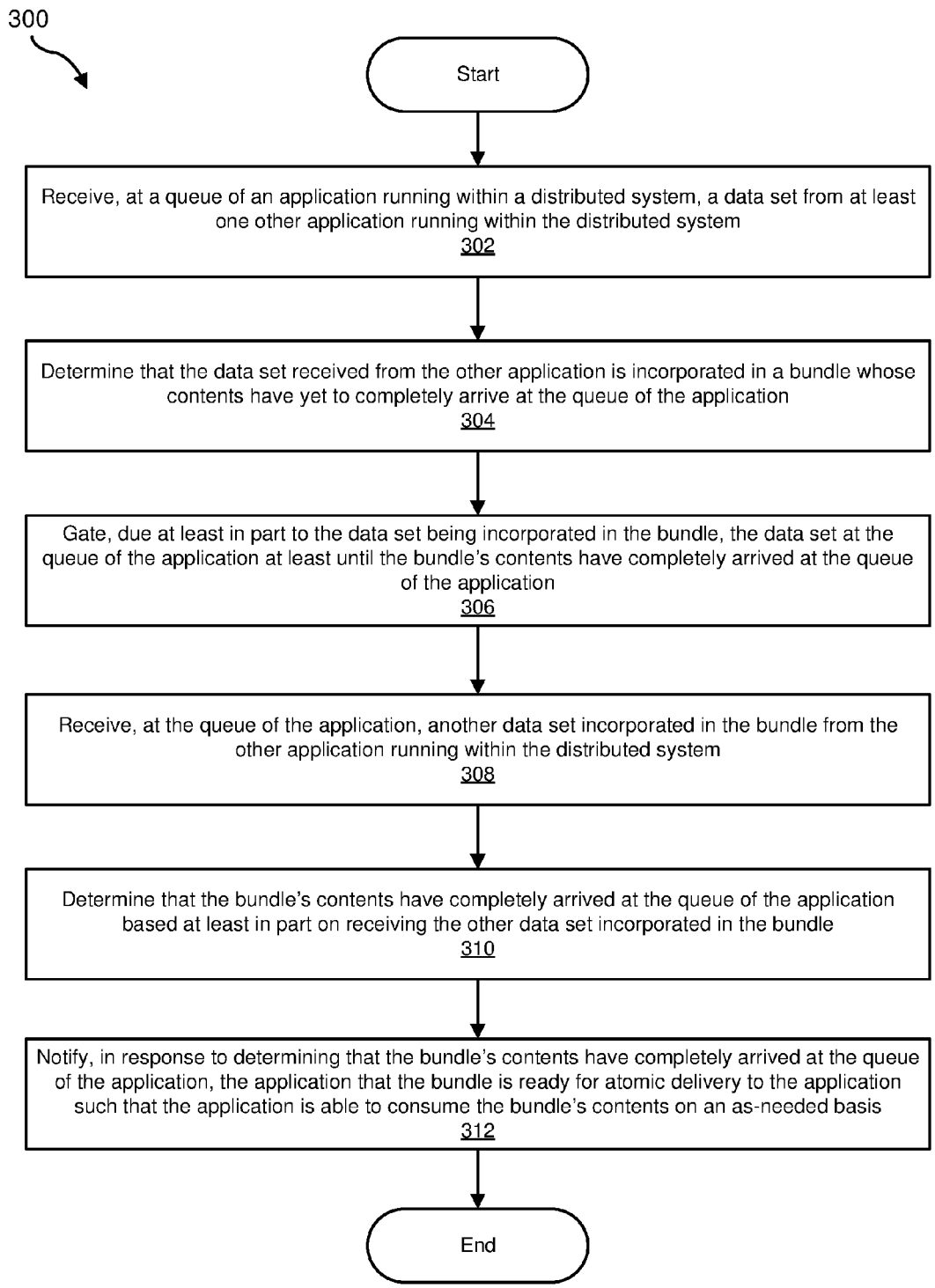
FIG. 3 is a flow diagram of an exemplary method for facilitating atomic delivery of bundled data sets to applications within distributed systems.

FIG. 3 is a flow diagram of an exemplary computer-implemented method 300 for facilitating atomic delivery of bundled data sets to applications within distributed systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 800 in FIG. 8.

As illustrated in FIG. 3, at step 302 one or more of the systems described herein may receive, at a queue of an application running within a distributed system, a data set from at least one other application running within the distributed system. For example, receiving module 104 may, as part of node 202(1) in FIG. 2, receive data set 216 at queue 214 of application 206(1) running on node 202(1) within distributed system 200. In this example, data set 216 may have originated from application 206(2) running on node 202(2) within distributed system 200.

The systems described herein may perform step 302 in a variety of ways and/or contexts. In some examples, receiving module 104 may receive data set 216 while waiting for data sets to arrive at queue 214 for processing and/or consumption by application 206(1). In other examples, receiving module 104 may receive data set 216 by querying another application for data sets to be processed and/or consumed by application 206(1).

In one example, receiving module 104 may receive data set 216 through distributor component 212(1) residing on node 202(1). For example, application 206(2) may direct distributor component 212(2) to send data set 216 to node 202(1) via network 204 using an Optimal Flooding Protocol (OFP). As data set 216 arrives at node 202(1), distributor component 212(1) may obtain data set 216 and then feed and/or place data set 216 into queue 214.

In one example, data set 216 may include and/or represent an encapsulated data object outputted by application 206(2). In this example, application 206(2) may have outputted the encapsulated object in response to input processed and/or consumed by application 206(2).

Returning to FIG. 3, at step 304 one or more of the systems described herein may determine that the data set received from the other application is incorporated in a bundle whose contents have yet to completely arrive at the queue of the application. For example, determination module 106 may, as part of node 202(1) in FIG. 2, determine that data set 216 received from application 206(2) is incorporated in bundle 210 whose contents have yet to arrive at queue 214 of application 206(1). In other words, the contents of bundle 210 may have already been defined and/or identified by application 206(2), but at least some of those contents may not have arrived yet at queue 214 of application 206(1).

The systems described herein may perform step 304 in a variety of ways and/or contexts. In some examples, determination module 106 may determine that data set 216 is incorporated in bundle 210 based at least in part on metadata of bundle 210. In one example, receiving module 104 may obtain the metadata of bundle 210 from application 206(2). For example, receiving module 104 may receive the metadata of bundle 210 in a separate exchange with application 206(2). In this example, the metadata of bundle 210 may travel from node 202(2) to node 202(1) as a distinct communication. Accordingly, the metadata of bundle 210 may be hoisted and/or maintained outside of the bundle's contents and/or the bundle itself. Additionally or alternatively, the metadata of bundle 210 may be described in a generic format (via, e.g., a domain-specific language). As a result, distributed system 200 may represent a data-type-agnostic and/or application-agnostic solution that enables applications to process and/or consume bundled data sets transferred without a centralized dependency management unit.

Once metadata of bundle 210 has arrived at node 202(1), determination module 106 may search the metadata of bundle 210 to find out and/or enumerate the contents of bundle 210. In this example, while searching the metadata of bundle 210, determination module 106 may identify data set 216 as being incorporated in and/or representing a portion of bundle 210. Determination module 106 may perform this search and/or make this determination before or after data set 216 arrives at queue 214 of application 206(1).

Figure 4:
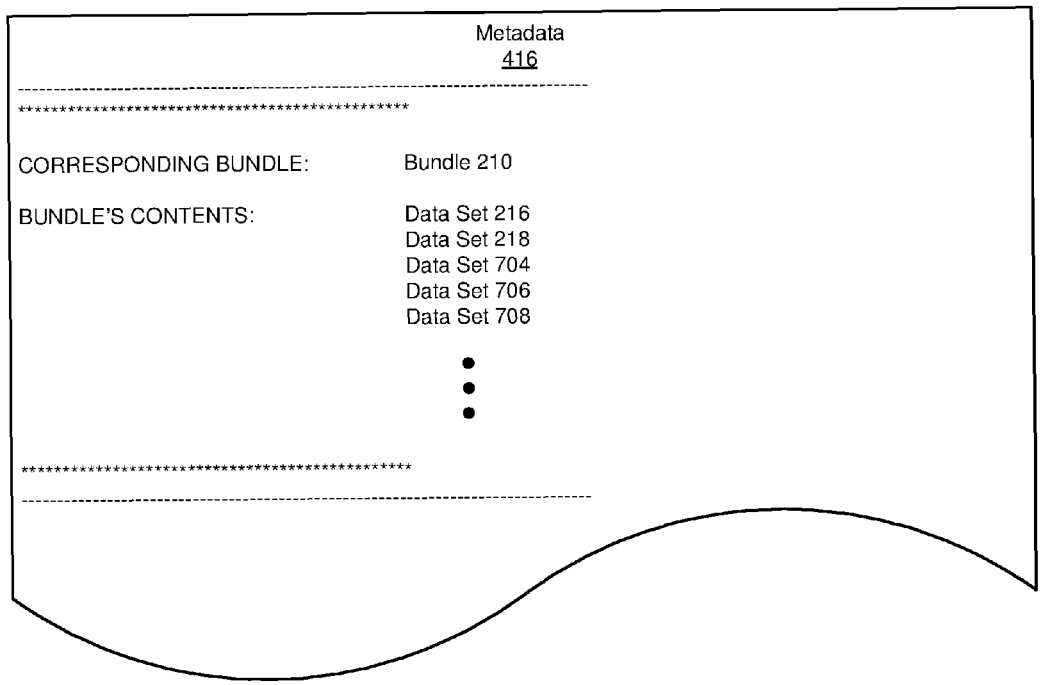
FIG. 4 is an illustration of exemplary metadata of a bundle of data sets.

As a specific example, determination module 106 may determine that data set 216 is incorporated in bundle 210 based at least in part on metadata 416 in FIG. 4. As illustrated in FIG. 4, metadata 416 may identify a corresponding bundle (in this example, "Bundle 210") and the contents of the corresponding bundle (in this example, "Data Set 216," "Data Set 218," "Data Set 704," "Data Set 706," "Data Set 708," and so on). In this example, determination module 106 may search metadata 416 of bundle 210 for the contents of bundle 210. In this example, by searching the metadata 416 in this way, determination module 106 may determine that data set 218 (along with various other data sets) is incorporated in bundle 210.

In some examples, metadata 416 of bundle 210 may also include various other information not illustrated in FIG. 4. In one example, metadata 416 may identify a bundle type and/or architecture of bundle 210. For example, metadata 416 may indicate that bundle 210 is represented as a tree, linked list, vector, map, and/or hash table. Additionally or alternatively, metadata 416 may identify one or more sub-bundles within bundle 210 and/or their corresponding types and/or architectures.

Returning to FIG. 3, at step 306 one or more of the systems described herein may gate, due at least in part to the data set being incorporated in the bundle, the data set at the queue of the application at least until the bundle's contents have completely arrived at the queue of the application. For example, gating module 108 may, as part of node 202(1) in FIG. 2, gate data set 216 at queue 214 of application 206(1) at least until all of the contents of bundle 210 have arrived at queue 214 of application 206(1). The phrase "to gate" or "gating," as used herein, generally refers to any type or form of process and/or procedure that involves storing and/or maintaining one or more data sets and/or bundles until the data sets' dependencies have been satisfied and/or the bundles' contents have arrived at a specific queue.

The systems described herein may perform step 306 in a variety of ways and/or contexts. In some examples, gating module 108 may gate data set 216 at queue 214 of application 206(1) by waiting for certain other data sets to arrive at queue 214. For example, in the event that data set 216 has a dependency of data set 218, gating module 108 may wait for data set 218 to arrive at queue 214 to ensure that the dependency of data set 216 is satisfied before atomic delivery of bundle 210 to application 206(1). Additionally or alternatively, gating module 108 may wait for all of the contents of bundle 210 to arrive at queue 214 to ensure that application 206(1) is able to properly consume the contents of bundle 210 by way of atomic delivery. Additionally or alternatively, gating module 108 may wait for bundle 210 to be built and/or restored at queue 214 to ensure that application 206(1) is able to properly consume the contents of bundle 210 by way of atomic delivery.

Returning to FIG. 3, at step 308 one or more of the systems described herein may receive, at the queue of the application, another data set incorporated in the bundle from the other application running within the distributed system. For example, receiving module 104 may, as part of node 202(1) in FIG. 2, receive data set 218 at queue 214 of application 206(1). In this example, data set 218 (like data set 216) may be incorporated in bundle 210. Data set 218 may have originated from application 206(2) running on node 202(2) within distributed system 200. Additionally or alternatively, data set 218 may have originated from application 206(N) running on node 202(N) within distributed system 200.

The systems described herein may perform step 308 in a variety of ways and/or contexts. In some examples, receiving module 104 may receive data set 218 while waiting for data sets to arrive at queue 214 for processing and/or consumption by application 206(1). In other examples, receiving module 104 may receive data set 218 by querying another application for data sets to be processed and/or consumed by application 206(1).

In one example, receiving module 104 may receive data set 218 through distributor component 212(1) residing on node 202(1). For example, application 206(2) or 206(N) may direct distributor component 212(2) or 212(N) to send data set 218 to node 202(1) via network 204 using an OFP protocol. As data set 218 arrives at node 202(1), distributor component 212(1) may obtain data set 218 and then feed and/or place data set 218 into queue 214.

In some examples, determination module 106 may determine that data set 218 is incorporated in bundle 210 based at least in part on metadata of bundle 210. For example, determination module 106 may search the metadata of bundle 210 to find out and/or enumerate the contents of bundle 210. In this example, while searching the metadata of bundle 210, determination module 106 may identify data set 218 as being incorporated in and/or representing a portion of bundle 210. Determination module 106 may perform this search and/or make this determination before or after data set 218 arrives at queue 214 of application 206(1).

Returning to FIG. 3, at step 310 one or more of the systems described herein may determine that the bundle's contents have completely arrived at the queue of the application based at least in part on receiving the other data set incorporated in the bundle. For example, determination module 106 may, as part of node 202(1) in FIG. 2, determine that all of the contents of bundle 210 have arrived at queue 214 of application 206(1) based at least in part on the receipt of data set 218.

The systems described herein may perform step 310 in a variety of ways and/or contexts. In some examples, determination module 106 may determine that all of the contents of bundle 210 have arrived at queue 214 of application 206(1) based at least in part on the metadata of bundle 210. For example, determination module 106 may compare the contents of bundle 210 that have arrived at queue 214 with the metadata of bundle 210. By comparing the received contents of bundle 210 with the metadata of bundle 210 in this way, determination module 106 may be able to determine whether one or more data sets incorporated in bundle 210 have not yet arrived at queue 214. Once the received contents of bundle 210 match the metadata of bundle 210, determination module 106 may determine that all of the contents of bundle 210 have arrived at queue 214 of application 206(1) and/or bundle 210 is ready to be atomically delivered to application 206(1).

In some examples, determination module 106 may determine that the bundle's contents incorporate a specific version of a particular data set that has yet to arrive at queue 214 of application 206(1). For example, bundle 210 may have a dependency that requires the most up-to-date version of data set 218 before atomic delivery to application 206(1). As a result, gating module 108 may continue gating the contents of bundle 210 at queue 214 of application 206(1) even after an outdated version of data set 218 has arrived at node 202(1). Once the most up-to-date version of data set 218 arrives at queue 214 of application 206(1), determination module 106 may determine that all of the bundle's contents have arrived at queue 214 and this dependency of bundle 210 has been satisfied.

In some examples, determination module 106 may override a dependency of data set 216, data set 218, and/or bundle 210 in the event that the dependency does not apply to application 206(1). In other words, determination module 106 may prune a dependency of data set 216, data set 218, and/or bundle 210 around the interests of application 206(1). For example, in the event that application 206(1) is not interested in data set 704, determination module 106 may essentially prune the dependency of bundle 210 on data set 704 such that bundle 210 is atomically delivered to application 206(1) without data set 704. In this example, determination module 106 may decide to perform this type of pruning based at least in part on certain intelligence from application 206(1). Accordingly, while such dependencies may, by default, be specified and/or selected by the application that sends bundle 210 to application 206(1), application 206(1) may alternatively have overriding authority to prune, disregard, and/or modify the dependencies specified and/or selected by the sending application.

In some examples, determination module 106 may determine whether bundle 210 is formatted correctly and/or is represented in the correct bundle type or architecture defined and/or specified in the metadata of bundle 210. In other words, in addition to determining whether all of the bundle's contents have arrived at queue 214, determination module 106 may determine whether bundle 210 is ready for atomic delivery to application 206(1) based at least in part on the formatting and/or architecture of bundle 210.

In one example, the metadata may require bundle 210 to be atomically delivered to application 206(1) as a tree, linked list, vector, map, and/or hash table. Additionally or alternatively, the metadata may require bundle 210 to be atomically delivered to application 206(1) as a certain combination of trees, linked lists, vectors, maps, and/or hash tables.

Figure 5:
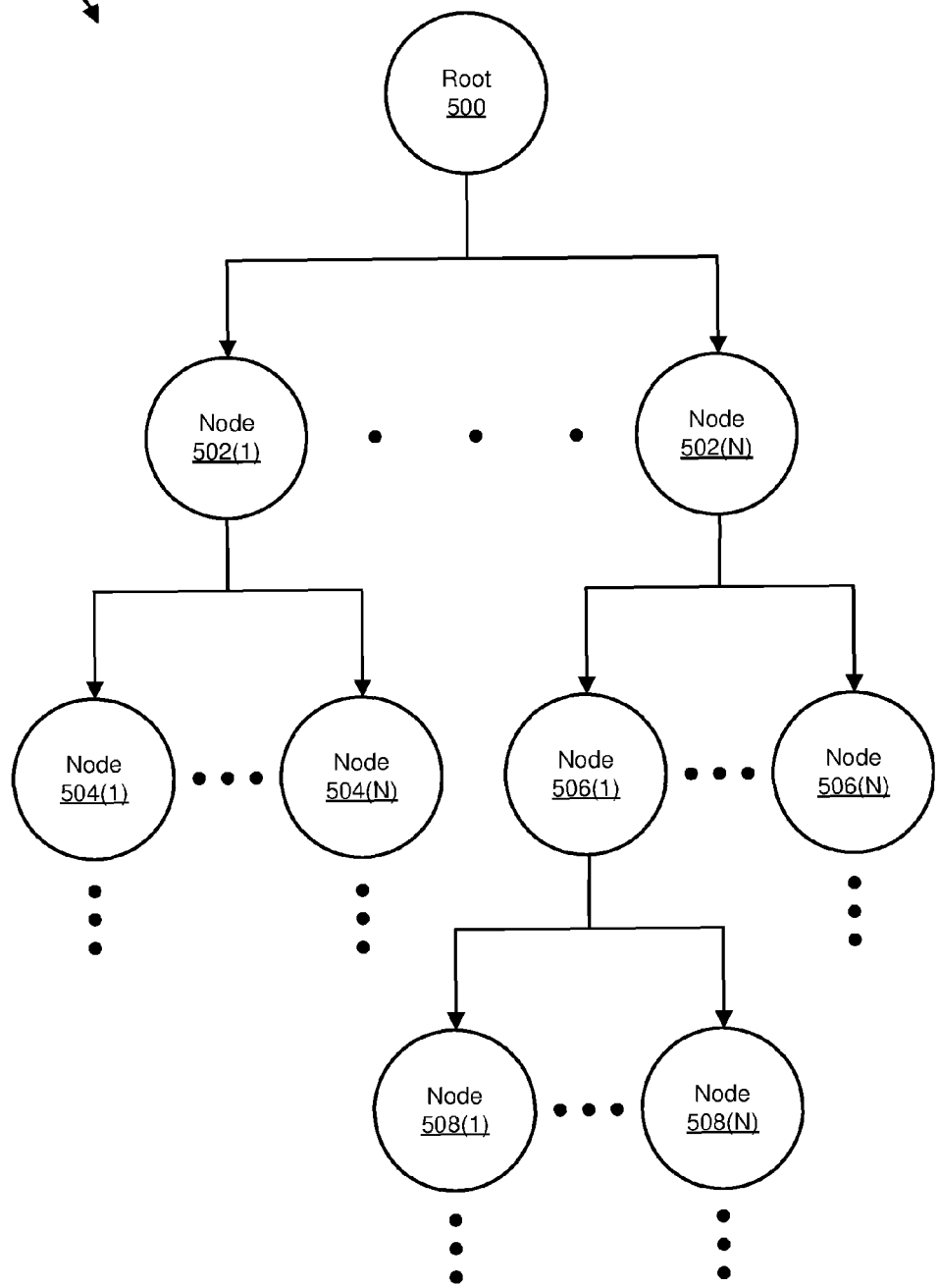
FIG. 5 is an illustration of an exemplary bundle architecture that includes a root and a plurality of nodes.
Figure 6:
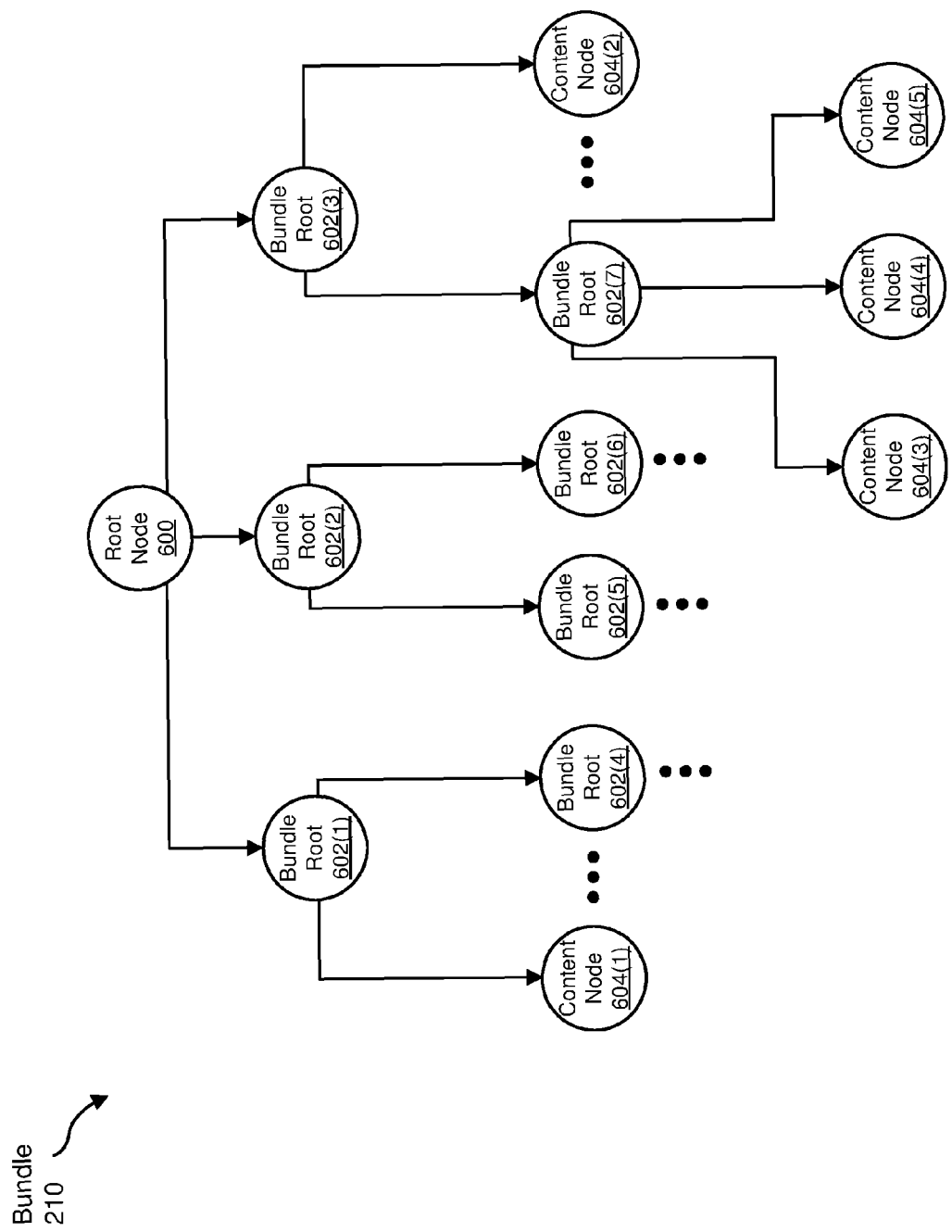
FIG. 6 is an illustration of an exemplary bundle of data sets represented as a data structure.

FIG. 5 is an illustration of an exemplary bundle architecture 510 for bundle 210. As illustrated in FIG. 5, bundle architecture 510 may represent a hierarchy of nodes. In particular, bundle architecture 510 may include a root node (in this example "Root 500") and a set of branch nodes that each represent either a content node that includes one or more data sets or a bundle root node that expands into a sub-bundle (in this example, "Nodes 502(1)-(N)," "Nodes 504(1)-(N)," "Nodes 506(1)-(N)," and "Nodes 508(1)-(N)").

In some examples, bundle module 112 may build bundle 210 at queue 214 of application 206(1) in preparation for atomic delivery to application 206(1). For example, bundle module 112 may organize the bundle's contents into at least one data structure (such as a tree, linked list, vector, map, and/or hash table). Additionally or alternatively, bundle module 112 may organize the bundle's contents into a heterogeneous collection of data structures (such as a combination of trees, linked lists, vectors, maps, and/or hash tables). In this example, bundle module 112 may embed, as part of the heterogeneous collection of data structures, at least one data structure of a first type (such as a tree) within at least one other data structure of a second type (such as a linked list).

As a specific example, bundle module 112 may build bundle 210 in FIG. 5 by organizing the contents of bundle 210 into a tree data structure. As illustrated in FIG. 5, bundle 210 may include a root node (in this example "Root Node 600"), various bundle root nodes that each represent the beginning of a sub-bundle or embedded bundle within bundle 210 (in this example, "Bundle Root 602(1)," "Bundle Root 602(2)," "Bundle Root 602(3)," "Bundle Root 602(4)," "Bundle Root 602(5)," "Bundle Root 602(6)," and "Bundle Root 602(7)"), and various content nodes that include, store, and/or represent the data sets incorporated in bundle 210 (in this example, "Content Node 604(1)," "Content Node 604(2)," "Content Node 604(3)," "Content Node 604(4)," "Content Node 604(5)," and so on).

In one example, root node 600 may include, store, and/or represent the metadata of bundle 210. For example, determination module 106 may be able to obtain metadata 416 in FIG. 4 by locating and/or accessing root node 600.

Additionally or alternatively, the bundle root nodes may each include, store, and/or represent metadata of the corresponding sub-bundle and/or embedded bundle within bundle 210. For example, determination module 106 may be able to obtain metadata of each of the sub-bundles and/or embedded bundles in FIG. 6 by locating and/or accessing bundle nodes 602(1)-(7). Bundle module 112 may then use such metadata to build and/or restore bundle 210 at queue 214 of application 206(1) as defined and/or specified by the application that sent bundle 210 to application 206(1).

Figure 7:
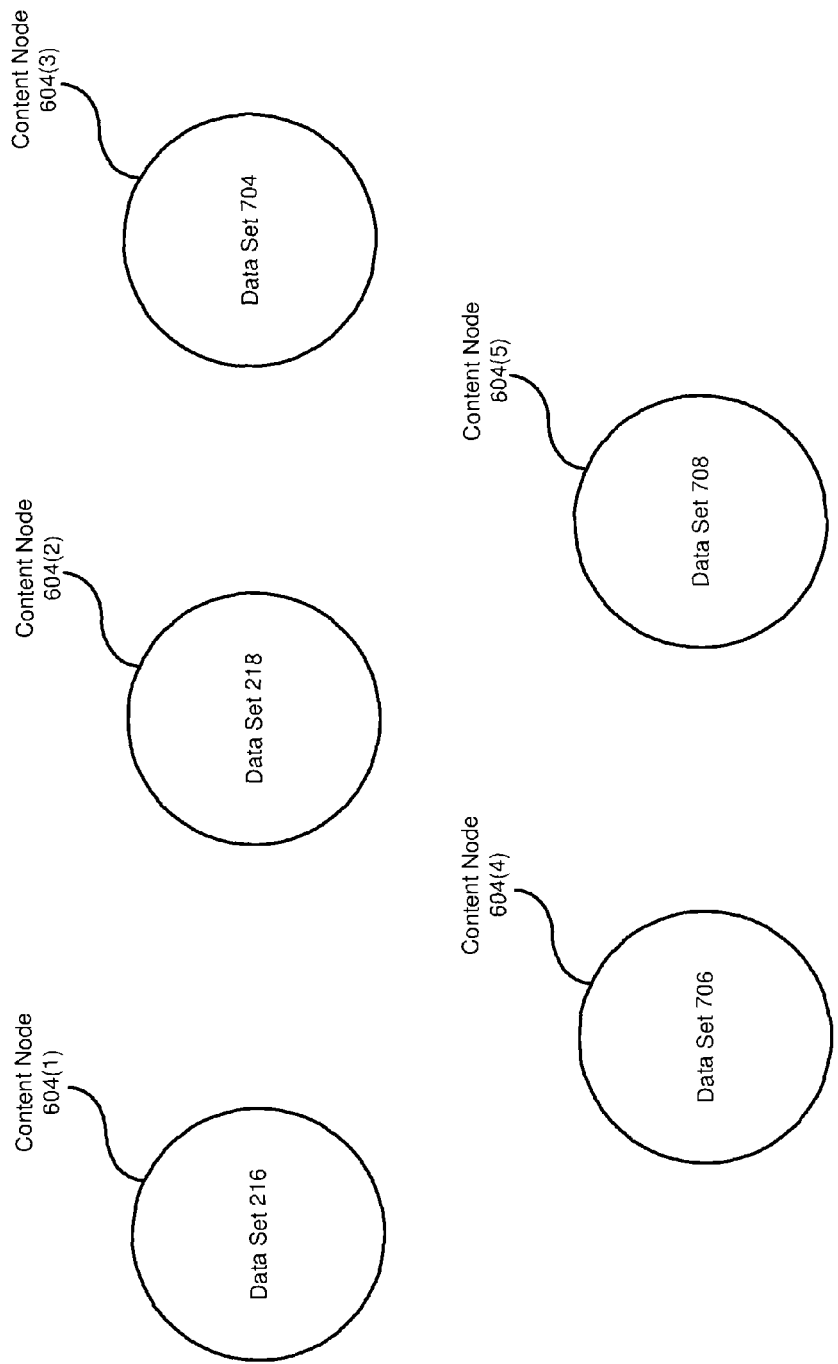
FIG. 7 is an illustration of exemplary data sets represented by content nodes within a bundle.

In one example, content nodes 604(1)-(5) in FIG. 7 may include, store, and/or represent certain data sets incorporated in bundle 210. As illustrated in FIG. 7, content nodes 604(1)-(5) may include, store, and/or represent data sets 216, 218, 704, 706, and 708, respectively.

As the size of bundle 210 increases, bundle module 112 may essentially replace certain content nodes with certain bundle root nodes to expand the data structure to account for the increased size of bundle 210. In other words, a bundle root node may replace a content node within bundle 210 to facilitate growth and/or scaling as additional data sets are incorporated in bundle 210. Additionally or alternatively, bundle module 112 may modify the configuration of bundle 210 to balance the size of the branches, sub-bundles, and/or embedded bundles within bundle 210.

In some examples, determination module 106 may determine that data set 216 or 218 has a dependency on another data set (not necessarily illustrated in FIG. 2 or 4) based at least in part on the metadata of bundle 210. In these examples, determination module 106 may search the metadata of bundle 210 for any dependencies of the data sets incorporated in bundle 210. By searching the metadata of bundle 210 in this way, determination module 106 may determine that data set 216 or 218 has a dependency on another data set that has yet to arrive at queue 214 of application 206(1). Accordingly, gating module 108 may continue gating the bundle's contents at queue 214 of application 206(1) until this other data set has arrived at queue 214 of application 206(1). In one example, the other data set may be incorporated in and/or represent a portion of bundle 210. In another example, the other data set may not be incorporated in and/or represent a portion of bundle 210.

Once the other data set has arrived at queue 214 of application 206(1), determination module 106 may determine that this dependency of data set 216 or 218 has been satisfied. Additionally or alternatively, determination module 106 may determine that all of the bundle's contents have arrived at queue 214 and/or bundle 210 is ready to be atomically delivered to application 206(1).

Returning to FIG. 6, at step 312 one or more of the systems described herein may notify, in response to determining that the bundle's contents have completely arrived at the queue of the application, the application that the bundle is ready for atomic delivery to the application such that the application is able to consume the bundle's contents on an as-needed basis. For example, delivery module 110 may, as part of node 202(1) in FIG. 2, notify application 206(1) that bundle 210 is ready for atomic delivery to application 206(1) such that application 206(1) is able to consume the bundle's contents on an as-needed basis. In this example, delivery module 110 may initiate the notification in response to the determination that the bundle's contents have completely arrived at queue 214 of application 206(1). The phrase "to process" or "to consume," as used herein with reference to an application, generally refers to any type or form of operation and/or task performed by the application using certain data sets as inputs, variables, and/or arguments for the operation and/or task.

The systems described herein may perform step 312 in a variety of ways and/or contexts. In one example, delivery module 110 may provide atomic delivery of the bundle's contents to application 206(1) by enabling application 206(1) to select which of the bundle's contents that queue 214 is to deliver to application 206(1). For example, delivery module 110 may enable application 206(1) to specify, to queue 214, one or more of content nodes 604(1)-(5) in FIGS. 6 and 7 to deliver to application 206(1).

Additionally or alternatively, delivery module 110 may enable application 206(1) to identify a path that leads from root node 600 to the selected content nodes. For example, delivery module 110 may enable application 206(1) to specify, to queue 214, bundle root nodes 602(3) and 602(7) in FIG. 6 as leading to content nodes 604(3)-(5). By identifying the path in this way, application 206(1) may be able to forgo consumption of certain sub-bundles, embedded bundles, and/or data sets in which application 206(1) is not interested.

In some examples, delivery module 110 may enable application 206(1) to determine when queue 214 is to deliver the bundle's selected contents to application 206(1). In other words, application 206(1) may be able to pull and/or retrieve certain contents from bundle 210 within queue 214 on an as-needed basis.

Additionally or alternatively, delivery module 110 may be able to provide atomic delivery of bundle 210 to application 206(1) by feeding the bundle's contents to application 206(1) for processing and/or consumption. For example, delivery module 110 may feed data sets 216, 218, 704, 706, and 708 in FIG. 7 to application 206(1) for processing and/or consumption by way of atomic delivery.

In some examples, delivery module 110 may provide atomic delivery of bundle 210 to application 206(1) by presenting the bundle's contents to application 206(1) via a data structure. For example, delivery module 110 may deliver a tree, linked list, vector, map, and/or hash table representative of bundle 210 to application 206(1). In this example, application 206(1) may use the tree, linked list, vector, map, and/or hash table to locate and/or access certain data sets incorporated in bundle 210 on an as-needed basis.

In some examples, bundle module 112 may modify the bundle's contents to incorporate an updated version of a certain data set without re-transferring any redundant versions of the bundle's contents from applications 206(2)-(N) to queue 214. For example, receiving module 104 may receive, at queue 214 of application 206(1), an updated version of data set 216 or 218 from application 206(2). In this example, application 206(1) may need to send only the updated version of data set 216 or 218 and may avoid sending any other data sets (e.g., data sets 704, 706, and 708) that have not been updated.

In one example, bundle module 112 may modify, within bundle 210, each bundle root along the path that leads from the root node to the content node representing data set 216 or 218 to account for the updated version of data set 216 or 218. For example, bundle module 112 may modify the metadata of each bundle root along the path to indicate that data set 216 or 218 has been updated in the corresponding content node. While performing these modifications, bundle module 112 may avoid modifying any bundle roots that do not lead from the root node to the content node representing data set 216 or 218. Bundle module 112 may also replace data set 216 or 218 with the updated version to account for the update without modifying any content nodes that do not represent data set 216 or 218. By performing updates to bundle 210 in this way, bundle module 112 may be able to improve the efficiency and/or scalability of distributed system 200 by reducing the amount of resources and/or bandwidth consumed in connection with such updates.

Figure 8:
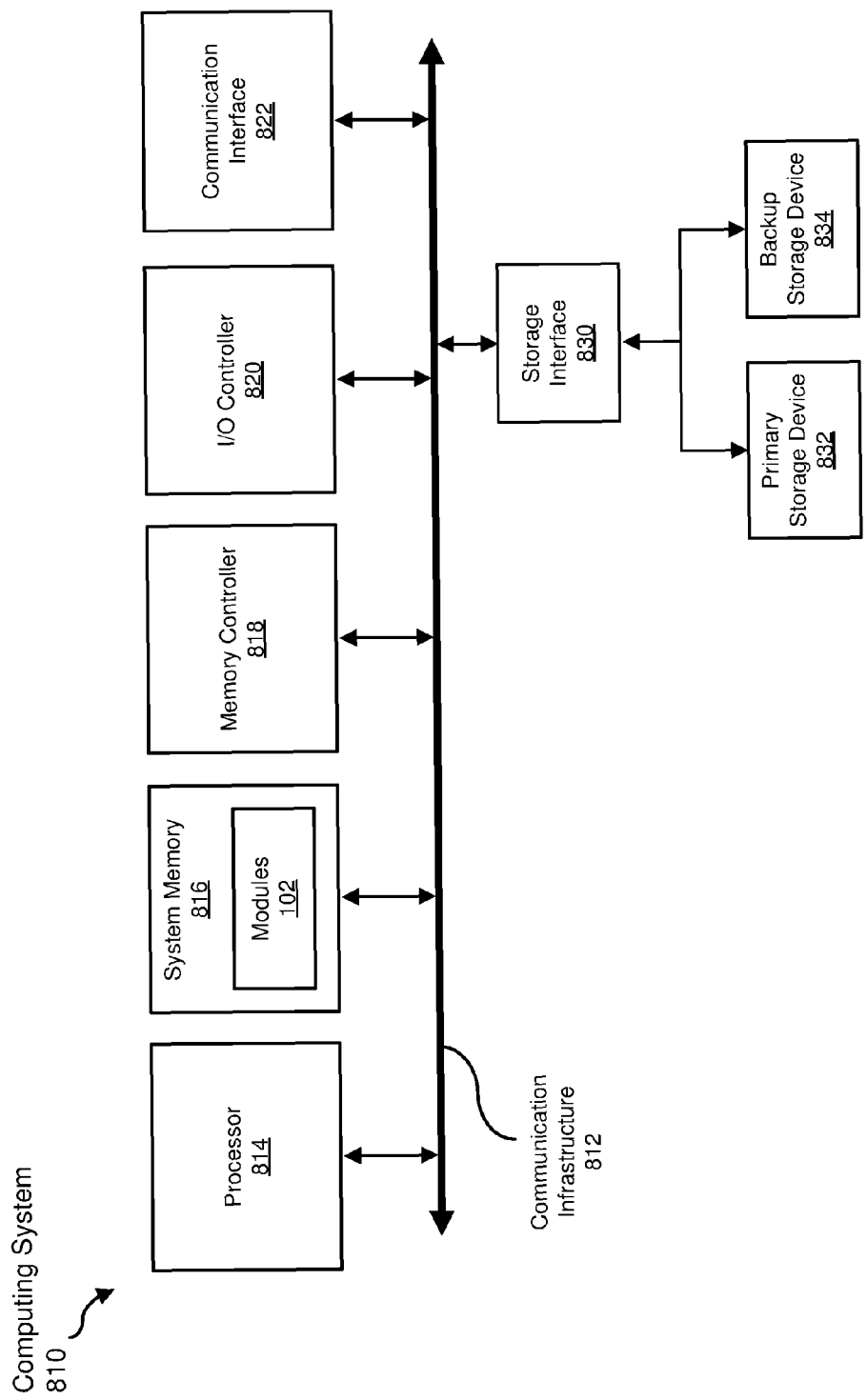
FIG. 8 is a block diagram of an exemplary computing system capable of implementing one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 5. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, network devices (e.g., wireless WLAN controllers, master APs, etc.), workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of distributed system 200 in FIG. 2 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a data set to be transformed, transform the data set into a combined data set that includes another data set, output a result of the transformation that complies with a dependency of the data set, use the result of the transformation as input for an application in accordance with the dependency, and deliver the result of the transformation to the application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    receiving, at a queue of an application running within a distributed system that includes a plurality of computing devices, a data set from at least one other application running within the distributed system;
    determining that the data set received from the other application is incorporated in a plurality of bundles whose:
        contents have yet to completely arrive at the queue of the application; and
        bundle roots each represent a beginning of a bundle within the plurality of bundles;
    gating, due at least in part to the data set being incorporated in the bundles, the data set at the queue of the application at least until the bundles' contents have completely arrived at the queue of the application;
    receiving, at the queue of the application, another data set incorporated in the bundles from the other application running within the distributed system;
    determining that the bundles' contents have completely arrived at the queue of the application based at least in part on receiving the another data set incorporated in the bundles;
    identifying, within a bundle root of one of the bundles, metadata of the bundle that indicates that contents of the bundle are to be organized in a specific flexible data structure for atomic delivery to the application;
    building the bundle at the queue of the application by organizing the bundle's contents into the specific flexible data structure;
    upon building the bundle at the queue of the application, notifying the application that the bundle is ready for atomic delivery to the application such that the application is able to consume the bundle's contents on an as-needed basis;
    providing atomic delivery of the bundle's contents to the application by at least one of:
        enabling the application to select which bundle within the plurality of bundles to consume by specifying, to the queue, the bundle root that represents the beginning of the selected bundle within the bundle roots; and
        enabling the application to forgo consumption of at least one bundle within the plurality of bundles by not specifying, to the queue, the bundle root that represents the beginning of the bundle to forgo within the bundle roots; and
    wherein:
        the bundles comprise a hierarchy of content nodes connected to the bundle roots;
        at least one of the content nodes within the hierarchy represents the data set received from the other application;
        at least one of the content nodes within the hierarchy represents the another data set received from the other application; and
        at least one of the bundle roots replaces at least one of the content nodes within the hierarchy.

2. The method of claim 1, wherein determining that the data set received from the other application is incorporated in the bundle comprises:
    obtaining the metadata of the bundle from the other application;
    searching the metadata for information that identifies the bundle's contents; and
    while searching the metadata, identifying the data set received from the application as part of the bundle's contents.

3. The method of claim 1, further comprising:
    determining that the bundle's contents incorporate a specific version of a further data set that has yet to arrive at the queue of the application;
    receiving, at the queue of the application, a different version of the further data set from the other application running within the distributed system; and
    wherein determining that the bundle's contents have completely arrived at the queue of the application comprises waiting for the specific version of the further data set to arrive at the queue of the application even though the different version of the further data set has already arrived at the queue of the application.

4. The method of claim 3, wherein gating the data set at the queue of the application comprises gating the bundle's contents at the queue of the application until the specific version of the further data set has arrived at the queue of the application.

5. The method of claim 1, further comprising providing atomic delivery of the bundle's contents to the application by at least one of:
    enabling the application to select which of the bundle's contents that the queue is to deliver to the application;
    enabling the application to determine when the queue is to deliver the bundle's selected contents to the application; and
    enable the application to pull certain contents from the bundle on an as-needed basis.

6. The method of claim 1, further comprising modifying the bundle's contents to incorporate an updated version of the another data set without re-transferring any redundant versions of the bundle's contents from the other application to the queue of the application by:
    receiving, at the queue of the application, the updated version of the another data set from the other application running within the distributed system;
    modifying, within the bundle, each bundle root along a path that leads from the bundle root to the content node representing the another data set to account for the updated version of the another data set without modifying any bundle roots that do not lead from the bundle root to the content node representing the another data set; and replacing the another data set with the updated version of the another data set to account for the updated version of the another data set without modifying any content nodes that do not represent the another data set.

7. The method of claim 1, wherein:
providing atomic delivery of the bundle's contents to the application comprises presenting the bundle's contents to the application via the flexible data structure.

8. The method of claim 1, wherein the flexible data structure comprises at least one of:
a tree data structure;
a list data structure;
a vector data structure;
a map data structure; and
a hash table.

9. The method of claim 1, wherein building the bundle at the queue of the application comprises:
organizing the bundle's contents into a heterogeneous collection of flexible data structures; and
embedding, as part of the heterogeneous collection of flexible data structures, at least one flexible data structure of a first type within at least one other flexible data structure of a second type.

10. The method of claim 1, wherein determining that the bundle's contents have completely arrived at the queue of the application comprises:
identifying a dependency of the data set on at least one further data set that has yet to arrive at the queue of the application;
gating, due at least in part to the dependency, the data set at the queue of the application at least until the further data set arrives at the queue of the application;
receiving, at the queue of the application, the further data set from the other application running within the distributed system; and
determining that the bundle's contents have completely arrived at the queue of the application based at least in part on receiving the further data set at the queue of the application.

11. The method of claim 10, wherein the further data set comprises at least one of:
a data set that is incorporated in the bundle; and
a data set that is not incorporated in the bundle.

12. The method of claim 1, wherein:
receiving the data set from the other application running within the distributed system comprises receiving the data set from a first application running within the distributed system; and
receiving the another data set from the other application running within the distributed system comprises receiving the another data set from a second application running within the distributed system.

13. A system comprising:
a receiving module, stored in at least one memory, that receives, at a queue of an application running within a distributed system that includes a plurality of computing devices, a data set from at least one other application running within the distributed system;
a determination module, stored in the memory, that determines that the data set received from the other application is incorporated in a plurality of bundles whose: contents have yet to completely arrive at the queue of the application; and
bundle roots each represent a beginning of a bundle within the plurality of bundles;
a gating module, stored in the memory, that gates, due at least in part to the data set being incorporated in the bundles, the data set at the queue of the application at least until the bundles' contents have completely arrived at the queue of the application;
wherein:
the receiving module further receives, at the queue of the application, another data set incorporated in the bundles from the other application running within the distributed system;
the determination module further determines that the bundles' contents have completely arrived at the queue of the application based at least in part on receiving the another data set incorporated in the bundles;
a bundle module, stored in the memory, that:
identifies, within a bundle root of one of the bundles, metadata of the bundle that indicates that contents of the bundle are to be organized in a specific flexible data structure for atomic delivery to the application; and
builds the bundle at the queue of the application by organizing the bundle's contents into the specific flexible data structure;
a delivery module, stored in the memory, that;
upon the building of the bundle at the queue of the application, notifies the application that the bundle is ready for atomic delivery to the application such that the application is able to consume the bundle's contents on an as-needed basis; and
provides atomic delivery of the bundle's contents to the application by at least one of:
enabling the application to select which bundle within the plurality of bundles to consume by specifying, to the queue, the bundle root that represents the beginning of the selected bundle within the bundle roots; and
enabling the application to forgo consumption of at least one bundle within the plurality of bundles by not specifying, to the queue, the bundle root that represents the beginning of the bundle to forgo within the bundle roots; and
at least one physical processor that executes the receiving module, the determination module, the gating module, the bundle module, and the delivery module; and
wherein:
the bundles comprise a hierarchy of content nodes connected to the bundle roots;
at least one of the content nodes within the hierarchy represents the data set received from the other application;
at least one of the content nodes within the hierarchy represents the another data set received from the other application; and
at least one of the bundle roots replaces at least one of the content nodes within the hierarchy.

14. The system of claim 13, wherein the determination module determines that the data set received from the other application is incorporated in the bundle by:
obtaining the metadata of the bundle from the other application;
searching the metadata for information that identifies the bundle's contents; and while searching the metadata, identifying the data set received from the application as part of the bundle's contents.

15. The system of claim 13, wherein:
the determination module further determines that the bundle's contents incorporate a specific version of a further data set that has yet to arrive at the queue of the application;
the receiving module further receives, at the queue of the application, a different version of the further data set from the other application running within the distributed system; and
the determination module determines that the bundle's contents have completely arrived at the queue of the application by waiting for the specific version of the further data set to arrive at the queue of the application even though the different version of the further data set has already arrived at the queue of the application.

16. A non-transitory computer-readable medium comprising one or more computer-executable instructions that, when executed by at least one processor of a computing device, cause the computing device to:
receive, at a queue of an application running within a distributed system that includes a plurality of computing devices, a data set from at least one other application running within the distributed system;
determine that the data set received from the other application is incorporated in a plurality of bundles whose:
contents have yet to completely arrive at the queue of the application; and
bundle roots each represent a beginning of a bundle within the plurality of bundles;
gate, due at least in part to the data set being incorporated in the bundles, the data set at the queue of the application at least until the bundles' contents have completely arrived at the queue of the application;
receive, at the queue of the application, another data set incorporated in the bundles from the other application running within the distributed system;
determine that the bundles' contents have completely arrived at the queue of the application based at least in part on receiving the another data set incorporated in the bundles;
identify, within a bundle root of one of the bundles, metadata of the bundle that indicates that contents of the bundle are to be organized in a specific flexible data structure for atomic delivery to the application;
build the bundle at the queue of the application by organizing the bundle's contents into the specific flexible data structure;
in response to determining that the bundle's contents have completely arrived at the queue of the application, notify the application that the bundle is ready for atomic delivery to the application such that the application is able to consume the bundle's contents on an as-needed basis;
provide atomic delivery of the bundle's contents to the application by at least one of:
enabling the application to select which bundle within the plurality of bundles to consume by specifying, to the queue, the bundle root that represents the beginning of the selected bundle within the bundle roots; and
enabling the application to forgo consumption of at least one bundle within the plurality of bundles by not specifying, to the queue, the bundle root that represents the beginning of the bundle to forgo within the bundle roots; and
wherein:
the bundles comprise a hierarchy of content nodes connected to the bundle roots;
at least one of the content nodes within the hierarchy represents the data set received from the other application;
at least one of the content nodes within the hierarchy represents the another data set received from the other application; and
at least one of the bundle roots replaces at least one of the content nodes within the hierarchy.

* * * * *